I. O. SMITH.

Furnace for Burning Edgings, Sawdust, &c.

No. 6,600. Reissued Aug. 17, 1875.

Attest:
Charles Hunman
R. A. Dyer

Inventor.
Ira O. Smith.
by Geo. W. Dyer & Co.
Attys.

UNITED STATES PATENT OFFICE.

IRA O. SMITH, OF MUSKEGON, MICHIGAN, ASSIGNOR OF ONE-HALF HIS RIGHT TO PETER WALKER, OF SAME PLACE.

IMPROVEMENT IN FURNACES FOR BURNING EDGINGS, SAWDUST, &c.

Specification forming part of Letters Patent No. 99,793, dated February 15, 1870; reissue No. 6,600, dated August 17, 1875; application filed June 29, 1875.

*To all whom it may concern:*

Be it known that I, IRA O. SMITH, of Muskegon, in the county of Muskegon and State of Michigan, have invented a new and useful Improvement in a Furnace for Burning Edgings, Sawdust, and other Waste; and I do declare that the following is a true and accurate description thereof, reference being had to the accompanying drawings, and to the letters of reference marked thereon, and being a part of this specification.

Figure 1:
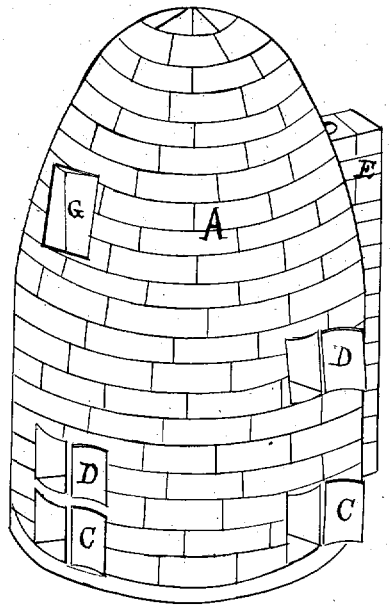
Figure 2:
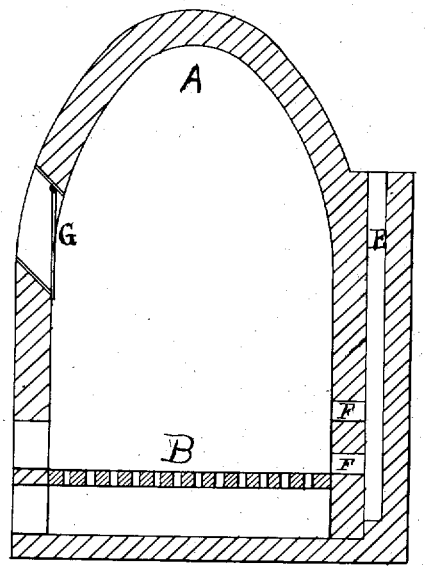

Figure 1 is a perspective, and Fig. 2 is a vertical section, of my invention.

The object of my invention is the construction of a furnace so arranged as to retain a very great heat at all times when in operation, and at the same time to have a great air-draft and unusual conveniences for stirring the fire, so as to admit air to all parts of it, so that the waste slabs, edgings, bark, and sawdust made in the manufacture of lumber in saw-mills (which waste materials are always green or water-soaked, and are inclined to pack closely wherever placed) may be burned as fast as they accumulate.

The nature of my invention consists in a conical furnace, with a dome made of suitable material, and so constructed that the products of combustion will be consumed within the same, and provided with a grate near its bottom, with several openings, both directly above and below the grate, for admission of air and for stirring the fire, which openings are furnished with doors, and with an opening near the top for the admission of the waste material to be burned, which opening has a door so suspended from its top that it will close by its own weight, and also with one or more openings above and near the grate for the escape of smoke into a suitable flue or chimney.

In the drawings, A represents a conically-shaped kiln or furnace; and B are fire-grates, secured therein at any desired height above the base. C are doors covering and closing openings in the walls of the kiln beneath the grates B, and as many of them may be employed as necessary. D are other and similar doors, covering and closing similar openings above the grates, for the purpose of admitting air above the grates when necessary, and to admit pokers to rake up the fire and clear the grates. E is a chimney or smoke-stack, communicating with the interior of the kiln by suitable exits F, one or more of which may be used, if desired. When two are employed, one should be a short distance, and the other considerably, above the grate. G is a door near the top of the kiln, and covers the opening through which the refuse is introduced into the kiln. This door is hung or pivoted at the top in such a manner that it will at all times be closed, unless it is compelled to open. The opening is so constructed that its bottom side inclines downward and inward, so that anything thrown upon it will slide down against the lower part of the door and compel it to open, when the material will drop into the kiln, and the door close by its own weight.

The drawing shows very fully the way the door is hung, and any further description of the operation of the device is deemed unnecessary.

What I claim as my invention is—

1. In a refuse-burner, the combination of a combustion-chamber, a reverberating-dome directly above and forming the upper part of the combustion chamber, and an exit for the products of combustion near the lower part of the combustion-chamber, substantially as and for the purposes set forth.

2. In a refuse-burning furnace, the combination of the self-closing door, hung upon the inner wall thereof, and the inclined chute terminating at such door, substantially as and for the purposes set forth.

3. In a refuse-burning furnace, substantially as described, the grate B, doors C, D, and G, and the openings covered by them, the exit F, and flue E, combined to operate substantially as and for the purpose set forth.

IRA O. SMITH.

Witnesses:

H. S. SPRAGUE,

WM. P. SPALDING.